(12) United States Patent
Chang et al.

(10) Patent No.: US 6,950,825 B2
(45) Date of Patent: Sep. 27, 2005

(54) FINE GRAINED ROLE-BASED ACCESS TO SYSTEM RESOURCES

(75) Inventors: David Yu Chang, Austin, TX (US); Ching-Yun Chao, Austin, TX (US); Hyen Vui Chung, Round Rock, TX (US); Carlton Keith Mason, Austin, TX (US); Vishwanath Venkataramappa, Austin, TX (US); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/159,482

(22) Filed: May 30, 2002

(65) Prior Publication Data

US 2003/0229623 A1 Dec. 11, 2003

(51) Int. Cl.[7] ............................................... G06F 17/30
(52) U.S. Cl. .................... 707/100; 707/10; 707/103; 707/9; 709/203; 709/225
(58) Field of Search .............................. 707/1, 10, 100, 707/103, 2, 9; 709/203, 225; 713/166, 200, 201, 202

(56) References Cited

U.S. PATENT DOCUMENTS

| | | | | |
|---|---|---|---|---|
| 5,911,143 A | * | 6/1999 | Deinhart et al. | 707/103 R |
| 6,014,666 A | | 1/2000 | Helland et al. | 707/9 |
| 6,023,765 A | | 2/2000 | Kuhn | 713/200 |
| 6,138,119 A | | 10/2000 | Hall et al. | 707/9 |
| 6,161,139 A | | 12/2000 | Win et al. | 709/225 |
| 6,631,417 B1 | * | 10/2003 | Balabine | 709/229 |
| 6,738,908 B1 | * | 5/2004 | Bonn et al. | 713/201 |
| 6,775,781 B1 | * | 8/2004 | Phillips et al. | 713/200 |
| 6,868,525 B1 | * | 3/2005 | Szabo | 715/738 |

* cited by examiner

Primary Examiner—Greta Robinson
Assistant Examiner—Cheryl Lewis
(74) Attorney, Agent, or Firm—Robert H. Frantz; David A. Mims, Jr.

(57) ABSTRACT

A security policy process which provides role-based permissions for hierarchically organized system resources such as domains, clusters, application servers, and resources, as well as topic structures for messaging services. Groups of permissions are assigned to roles, and each user is assigned a role and a level of access within the hierarchy of system resources or topics. Forward or reverse inheritance is applied to each user level-role assignment such that each user is allowed all permissions for ancestors to the assigned level or descendants to the assigned level. This allows simplified security policy definition and maintenance of user permissions as each user's permission list must only be configured and managed at one hierarchical level with one role.

27 Claims, 10 Drawing Sheets

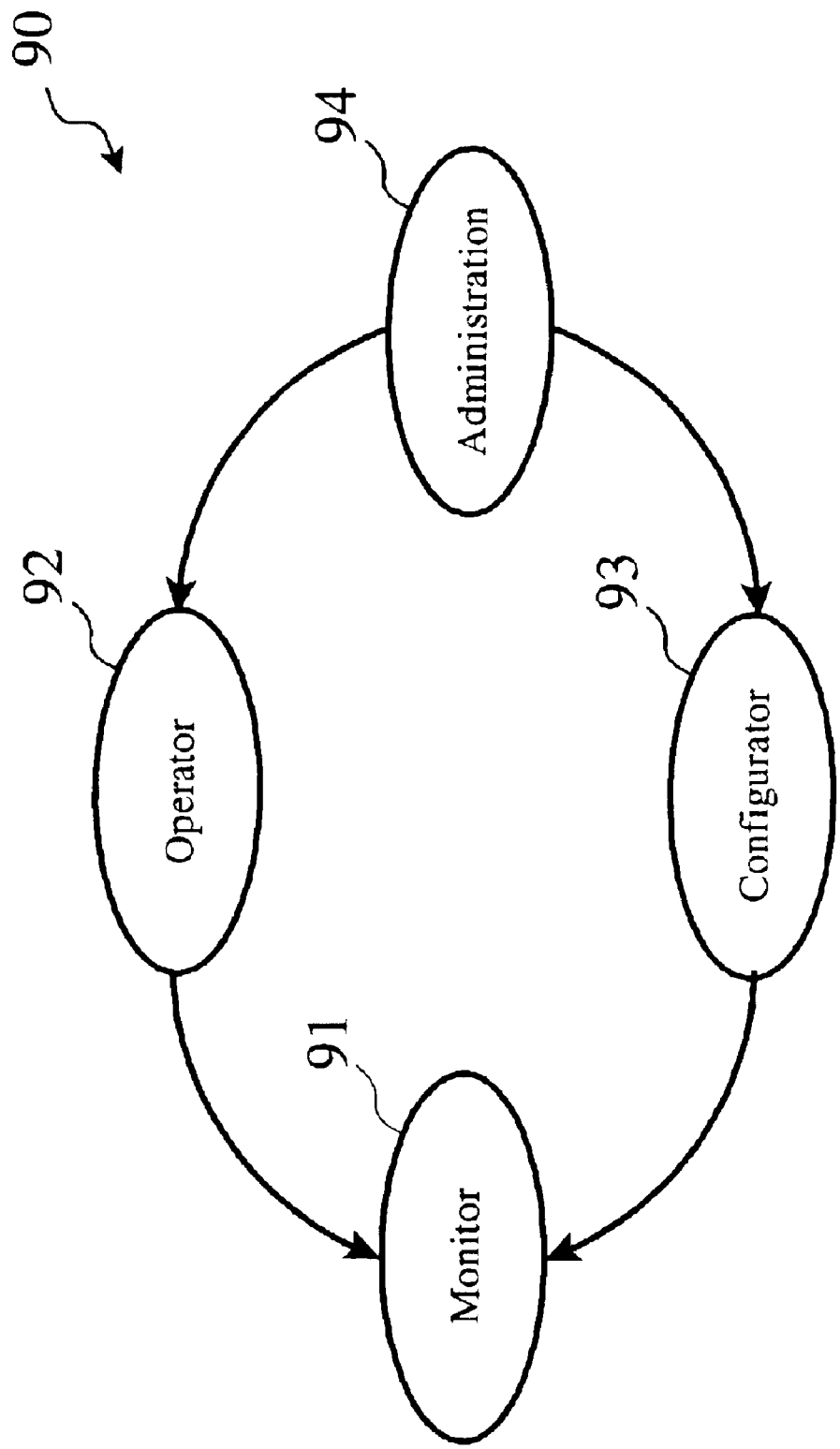

FINE GRAINED ROLE-BASED ACCESS TO SYSTEM RESOURCES

BACKGROUND OF THE INVENTION

1. Field of the Invention

This invention relates to methods and systems for security authorization of networked computer resources, and especially to technology for providing fine grained access control to system resources in an Java Version 2 Enterprise Edition (J2EE) environment.

2. Background of the Invention

Application servers are prevalent throughout business, scientific and entertainment industries, as they provide everything from "back office" automation such as billing, accounting, and order entry functions; to customer interface functions such as allowing clients to place orders directly into a suppliers computers, reserve products or services, and manage their own accounts; to online entertainment and gaming systems which allow customers to access games and useful information in trade for being presented marketing information, banner advertisements, and sponsored hyperlinks. As such, application servers may communicate with client computers via a corporate intranet or private computer network, via a publicly accessible network such as the Internet, or both.

An application server is a server computer and one or more programs that provides the logic for an online or automated application, and is typically part of a larger, distributed computing system. Application servers are often modeled as a component of a three-tier system having a graphical user interface (GUI) server, an application or business logic server, and a database server.

One such application server is the WebSphere [TM] product from International Business Machines. WebSphere is available for a number of platforms, including computers from personal computers to high-end "main frames" running operating systems ranging from Microsoft Windows NT [TM], to IBM's AIX [TM], to the open source Linux.

A WebSphere application server provides an environment for open distributed computing. Users and processes on a wide variety of platforms can interact by using the facilities provided by WebSphere. A common method of organizing software to run on distributed systems is to separate functionality into two parts: clients and servers. A client is system that runs one or more programs and uses services provided by server systems, the server systems themselves running one or more server programs. The client system makes a request for a service to the server system, and a server system performs that service on behalf of the client system.

For many applications, the application server cooperates with or even incorporates a Web server, such as a hyper text transfer protocol (HTTP) server, for communicating with web browser computers as the client computers. In such an instance, the application server is often referred to as a "Web Application Server" or "Web Server". In this configuration, a web browser client allows the user interface to be implemented in the well-known hyper text markup language (HTML). A typical web server provides one or more well-known methods to forward a request to an application server and to return information to the user, including: Common Gateway Interface (CGI), Microsoft's [TM] Active Server Pages (ASP), Java Server Pages (JSP), or even the more advanced Common Object Request Broker Architecture (CORBA).

Server system functionality usually includes "resource management", through which a server synchronizes and manages access to one or more "resources" such as databases or database servers. Client requests are received by the server system, processed, and appropriate accesses to the resources are made. A response to the client system is then created and transmitted to the client system. This general model is applicable to many server paradigms, including online banking, order entry and tracking, e-commerce, and even electronic mail processing.

Client programs typically handle user interactions, such as presenting drop down lists, menus, pages of information, and "playing" animated graphics or audio. Client programs also typically include functionality to request data or to initiate some data modification on behalf of a user by the server system. For example, a client system can display a form on which a user can enter orders for a product. The client may then transmit this order information to a server system, which checks a product database and performs tasks needed for billing and shipping.

In many cases, a single server system is used by multiple clients simultaneously. For example, dozens or hundreds of clients can interact with a handful of servers that control database access.

A common model of client/server systems, shown in FIG. 1, which uses three tiers: one or more client systems (10) that interact with the users, one or more application servers (12) that contain the business logic of the applications provided to the users, and one or more resource managers (13) and associated data stores (14) that store and retrieve data.

In this model, the network (11) between the clients and the servers (12) may be a corporate local area network (LAN) or intranet, such as in the case of a corporate application server which is not publicly accessible. In this case, the client systems may be provided with any specific software programs, such as IBM's Lotus Notes, which cooperates with the application server programs. For applications which are intended for widespread use or public use, the network (11) may be the Internet, the client computers may be equipped with appropriate web browser software such as Netscape's Navigator [TM], and the application servers are equipped with appropriate HTTP server software, such as the IBM WebSphere product. For applications which are intended for "internal" or corporate use, such as banking applications or insurance applications, the network (11) may be a virtual private network ("VPN") or an intranet, with teh client computers and application servers being equipped similarly.

The interfaces between the servers (12) and the resource manager(s) (13) may be LAN, Internet, or a proprietary interface. The data stores and databases (14) may be physically housed in separate platforms, or may be integrated to the resource managers (13). In some cases, the resource managers, databases, and application servers may be software processes all executing on the same platform, too.

Using this arrangement of systems and functionality, the client systems (10) are isolated from having to know anything about the actual resource managers (13) and resources (14). It needs only to have the capability to communicate and interact with the server systems (12), and does not have to have specific capabilities or software to communicate directly with the resources (14). This allows a change in service to be realized in the resource tier of the arrangement without requiring changes to the client systems.

For example, a bank may install a new system of databases for online loan processing. With this arrangement, an HTML web browser client computer may be enabled to access these new databases and online loan services through changes to the server computer programs only, without need for changes to the client computer. Since most servers are relatively few in number compared the to vast number of client computers (and potential client computers) they server, this is an significant advantage of the arrangement. Additionally, the resource manager can be assigned the task of security and access control such that users requesting secure data from the resources may be allowed or denied access to that data.

Because there is often need to rapidly develop and deploy in the market place new business applications and enhancements to existing business applications, there are several "standards" with which most application servers are compatible. This allows the business application program developers to work within programming and computing environments in which they are familiar, regardless of which specific application server platform will eventually execute the application.

In recent years, Sun Microsystems' Java [TM] programming language and programming environment have gained widespread acceptance and use due to its portability between a wide variety of platforms, and due to its object oriented methodology.

Java client programs, or "applets", can be delivered by a server computer to a client computer using common protocols such as HTTP, with links to retrieve the applets embedded in forms or web pages. Server programs are often implemented as a collection of "servlets".

Sun Microsystems has extended the definition of the general Java environment to include more enterprise and distributed computing functionality, called Java platform Version 2 Enterprise Edition (J2EE). J2EE supports the 3-tiered model of client-server-resource manager, as previously described. The J2EE platform is a platform for hosting J2EE applications specified as a set of required application program interfaces (APIs) and policies. The J2EE specifications and documentation are readily available from Sun Microsystems, and J2EE is well-known by those skilled in the art.

Java Messaging Services ("JMS") allows Java programs to create, send, receive and read messages within an enterprise messaging system. Such enterprise messaging products, which are also referred to as "Message Oriented Middleware" ("MOM") products, are useful for integrating intra-company operations. Separate business components can be combined into a reliable and flexible system. Database vendors, internet related companies, and companies who specialize in MOM products provide such well known enterprise messaging products.

In general, to benefit from these features, Java language clients and middle tier services may use JMS to access these enterprise messaging capabilities within a system.

JMS comprises a set of interfaces and associated semantics allowing JMS clients to access the functions and facilities of an enterprise messaging product. In such a system, messaging is "peer-to-peer", and as such, programs which implement JMS are usually referred to as "clients". A JMS "application", likewise, comprises a set of application defined messages, and a set of JMS clients that exchange them.

This type of messaging, however, should not be confused with other types of computer-based messaging, such as electronic mail. In our present context of enterprise systems messaging, "messages" are asynchronous requests, reports or events that created by, consumed by, and exchanged between enterprise applications in order to coordinate these systems activities and functions. Such message contain precisely formatted data describing specific business and enterprise actions.

Typically, every messaging client can send messages to and receive messages from any other messaging client. In order to do so, a messaging client must "connect" to a "messaging agent" which provides facilities for creating, sending and receiving messages. Within each messaging system, a method for addressing messages is provided, as well as methods for creating messages, and filling messages with data. Some systems only provided point-to-point message sending, while others provide broadcast (point-to-multipoint) sending capabilities, as well. Further, some systems provide only asynchronous reception of message which are delivers to the destination client as they arrive, other systems provide synchronous receipt of message which are delivered to the destination client upon request by the destination client, and some systems provide both capabilities. Other system facilities which may or may not be provided by a particular messaging system include:

(a) delivery confirmation or guarantee methods, including "best effort" delivery to guaranteed delivery;

(b) message "time-to-live";

(c) message priority; and (d) message response requirement.

A JMS "provider" is the entity that implements JMS for a messaging product. In order to use these messaging facilities to send, receive or exchange JMS messages, clients must use the set of message interfaces defined by JMS which are implemented by their JMS provider.

JMS messaging products may fall into two general categories of capabilities or "domains": (a) point-to-point ("PTP") or (b) publish-subscribe ("Pub/Sub") systems. PTP systems are based upon message queues in which every message is addressed to a certain queue, and every message consumer or recipient extracts messages from the queues as needed. Pub/Sub systems, rather, provide for messages to be addressed to a "node" in a content hierarchy, wherein some clients "publish" messages to a certain node and other clients "subscribe" to receive messages from that node.

A "topic" is an object that encapsulates a provider-specific topic name. Many Pub/Sub messaging system group topics into hierarchies with options for subscribing to parts or portions of the topic hierarchy. Under JMS, a topic object may represent just a '"leaf" in a topic hierarchy, or it might be a much larger part of the hierarchy. How topics are organized, and the granularity to which clients may subscribe to those topics, is determined by the Pub/Sub systems architecture, and is not restricted by the JMS specifications.

The JMS specification also does not define any required facilities for administering topics (e.g. how topics are created, deleted, etc.) within a messaging system. As access control is not part of JMS Specification, it is up to each JMS provider to determine their own solution. As such, some available enterprise messaging products only allow topics to be statically defined with associated authorization control lists, and still other products do not even include concepts of topic administration.

Within the enterprise messaging product provide by International Business Machines (IBM) WebSphere [TM], the JMS implementation provides an access control extension which allows users to be assigned to manage a specific topic, and topics are organized as a tree hierarchy (50) as shown in FIG. 3. Users who have been assigned certain permissions to a higher level Topic, such as "water" (53) automatically get the same access permissions to Topic at lower level, such as "yachting" (54) and "windsurfing" (55), unless explicitly denied at lower levels.

In the IBM JMS implementations, the types of user permissions include "+pub", "+sub", "+persist", "−pub", "−sub", and "−persist", where a plus symbol "+" means granting a permission and a minus symbol "−" means denying permission. Permission may be assigned to all users, i.e., "public" or to a specific user. This scheme supports permission inheritance for both positive (granting) and negative (denying) permission.

In the J2EE application server environment, there are system resources other than the J2EE resources, such as Java Server Pages ("JSP"), servlets, and Enterprise Java Beans ("EJB"), to which access needs to be controlled. Those system resources include, but are not limited, to system administrative resources, such as the JMX ("Java Management Extension") MBeans, JNDI ("Java Name and Directory Interface") naming space, JMS ("Java Message Service") Queues and Topics, Dynamic Queries, runtime components, etc.

Fine grained access control to these system resources is often required, as well. For example, certain financial institutions require the application server system management to support access control scope finer than the single security domain level. These users need to be able to restrict an administrator to manage only a single application server in the entire security domain. Other system resources, including JMS and dynamic queries, have similar requirements.

According to the J2EE specifications, access control is based on security "roles". J2EE has a flat resources naming space, and does not organize the system resources into a logical hierarchy. Further, J2EE does not support permission inheritance, as this would imply a non-flat resource organization of some type.

Therefore, there is a need in the art for a system and method of access based upon user roles which can be applied to hierarchically organized enterprise system resources, including message topics and subtopics, as well as domains, clusters, applications, application servers, and the like. There is a need in the art for this system to provide definable inheritance, both forward and reverse, to facilitate effective enterprise management and administration. Further, there is a need in the art for this system to be compliant with and extend the concepts and specifications of existing enterprise servers, and especially J2EE.

BRIEF DESCRIPTION OF THE DRAWINGS

The following detailed description when taken in conjunction with the figures presented herein provide a complete disclosure of the invention.

FIG. 7 illustrates the security role inheritance relationship implemented in WebSphere.

SUMMARY OF THE INVENTION

The invention provides a fine grained access control to networked system resources, including JMS topics and system administration capabilities. For example, users may be restricted to manage only a single application server in the entire security domain. The invention is most useful in conjunction with J2EE security role based authorization model to provide access control to those system resources, and it extends the J2EE model to satisfy the fine grained authorization requirements of those system resources.

The invention allows the system management capabilities to be partitioned finer than the single administrator role of the prior art. Some users may be granted the ability to perform operations on the system resources in the proper scope, but they may be restricted from modifying system configurations. Other users may be granted the ability to manage the system configuration for the specified scope, but restricted from changing the runtime state, i.e., perform operations on them. Still other users may be given the ability to monitor the system configuration and runtime status, but restricted from performing anything more than that for the specified access control scope.

Figure 3:
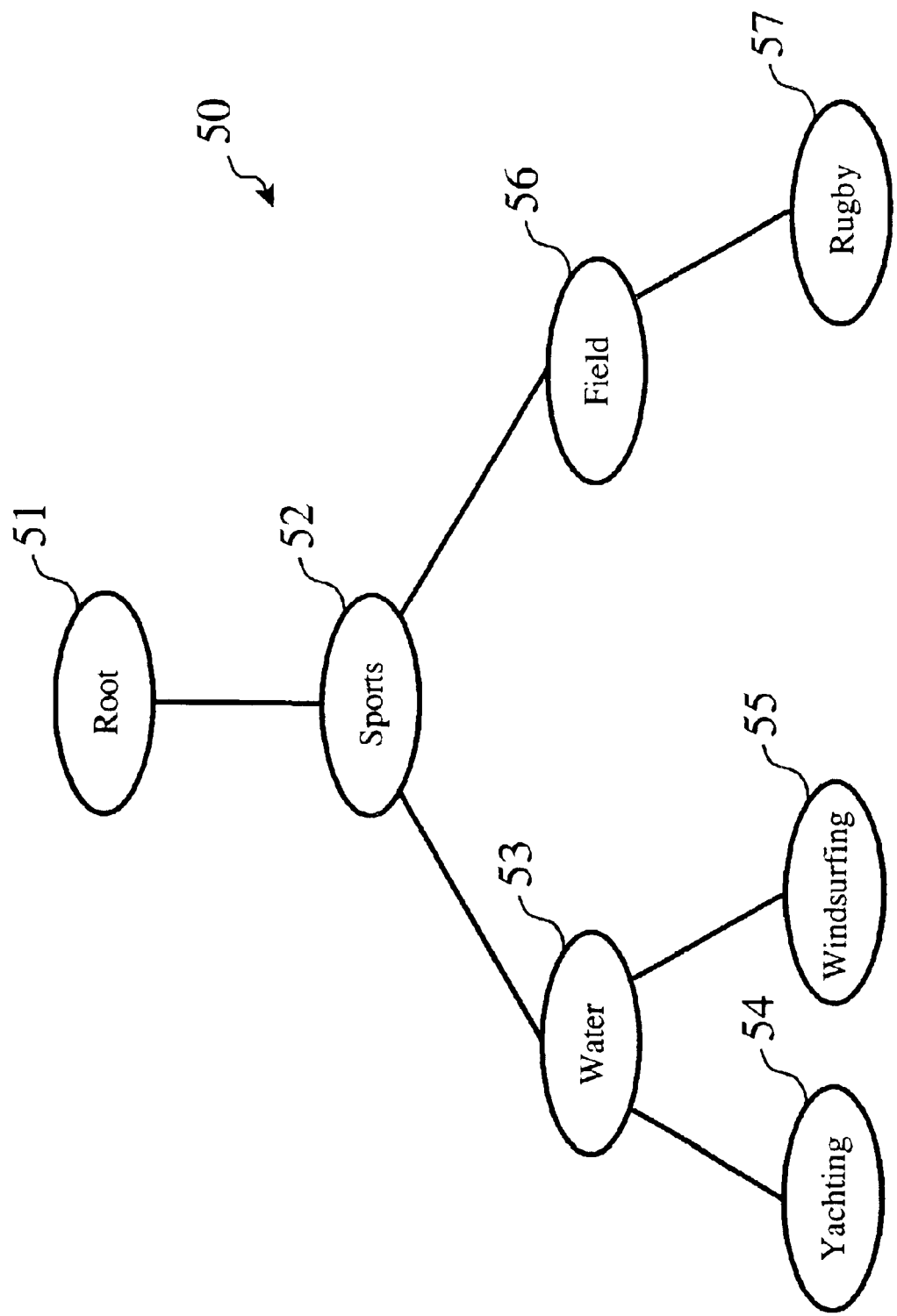
FIG. 3 depicts a topics tree hierarchy for a messaging service.

Applying the invention to subscription rights to a JMS topic hierarchy, users may be granted ability to perform specific actions (read, publish, both) to specific topics and sub-topics, without necessarily receiving rights to all other topics which include those specific sub-topics. Returning to our example shown in FIG. 3, a particular user may be granted "read" ability to the "rugby" sub-topic (57), but restricted from accessing messages posted to the more general "field" topic (56) and "sports" topic (52).

DETAILED DESCRIPTION OF THE INVENTION

The present invention is preferably realized in part by a computing platform, such as personal computers, web servers, and web browsers, and in part by certain methods and processes implemented in software. These common computing platforms can include personal computers, enterprise servers, as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Computing Platform Overview

Figure 4:
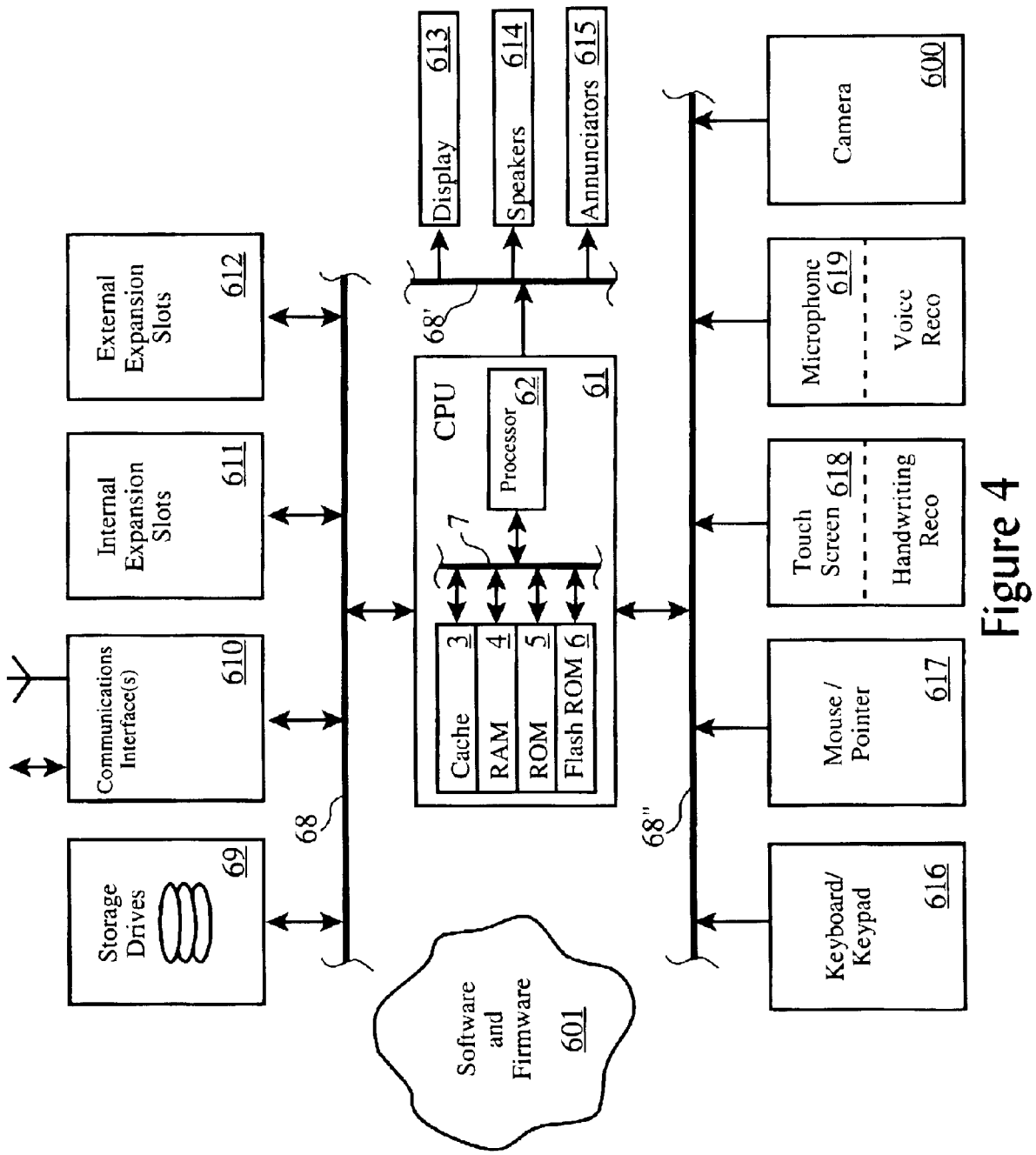
FIG. 4 sets forth a generalized architecture of a computing platform.

Turning to FIG. 4, a generalized architecture is presented including a central processing unit (61) ("CPU"), which is typically comprised of a microprocessor (62) associated with random access memory ("RAM") (64) and read-only memory ("ROM") (65). Often, the CPU (61) is also provided with cache memory (63) and programmable FlashROM (66). The interface (67) between the microprocessor (62) and the various types of CPU memory is often referred to as a "local bus", but also may be a more generic or industry standard bus.

Many computing platforms are also provided with one or more storage drives (69), such as a hard-disk drives ("HDD"), floppy disk drives, compact disc drives (CD, CD-R, CD-RW, DVD, DVD-R, etc.), and proprietary disk and tape drives (e.g., Iomega Zip [TM] and Jaz [TM], Addonics SuperDisk [TM], etc.). Additionally, some storage drives may be accessible over a computer network.

Many computing platforms are provided with one or more communication interfaces (610), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (611), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (612) allowing the user the ability to easily install and remove hardware expansion devices, such as PCMCIA cards, SmartMedia cards, and various proprietary modules such as removable hard drives, CD drives, and floppy drives.

Often, the storage drives (69), communication interfaces (610), internal expansion slots (611) and external expansion slots (612) are interconnected with the CPU (61) via a standard or industry open bus architecture (68), such as ISA, EISA, or PCI. In many cases, the bus (68) may be of a proprietary design.

A computing platform is usually provided with one or more user input devices, such as a keyboard or a keypad (616), and mouse or pointer device (617), and/or a touch-screen display (618). In the case of a personal computer, a full size keyboard is often provided along with a mouse or pointer device, such as a track ball or TrackPoint [TM]. In the case of a web-enabled wireless telephone, a simple keypad may be provided with one or more function-specific keys. In the case of a PDA, a touch-screen (618) is usually provided, often with handwriting recognition capabilities.

Additionally, a microphone (619), such as the microphone of a web-enabled wireless telephone or the microphone of a personal computer, is supplied with the computing platform. This microphone may be used for simply reporting audio and voice signals, and it may also be used for entering user choices, such as voice navigation of web sites or autodialing telephone numbers, using voice recognition capabilities.

Many computing platforms are also equipped with a camera device (600), such as a still digital camera or full motion video digital camera.

One or more user output devices, such as a display (613), are also provided with most computing platforms. The display (613) may take many forms, including a Cathode Ray Tube ("CRT"), a Thin Flat Transistor ("TFT") array, or a simple set of light emitting diodes ("LED") or liquid crystal display ("LCD") indicators.

One or more speakers (614) and/or annunciators (615) are often associated with computing platforms, too. The speakers (614) may be used to reproduce audio and music, such as the speaker of a wireless telephone or the speakers of a personal computer. Annunciators (615) may take the form of simple beep emitters or buzzers, commonly found on certain devices such as PDAs and PIMs.

These user input and output devices may be directly interconnected (68', 68") to the CPU (61) via a proprietary bus structure and/or interfaces, or they may be interconnected through one or more industry open buses such as ISA, EISA, PCI, etc.

The computing platform is also provided with one or more software and firmware (601) programs to implement the desired functionality of the computing platforms.

Figure 5:
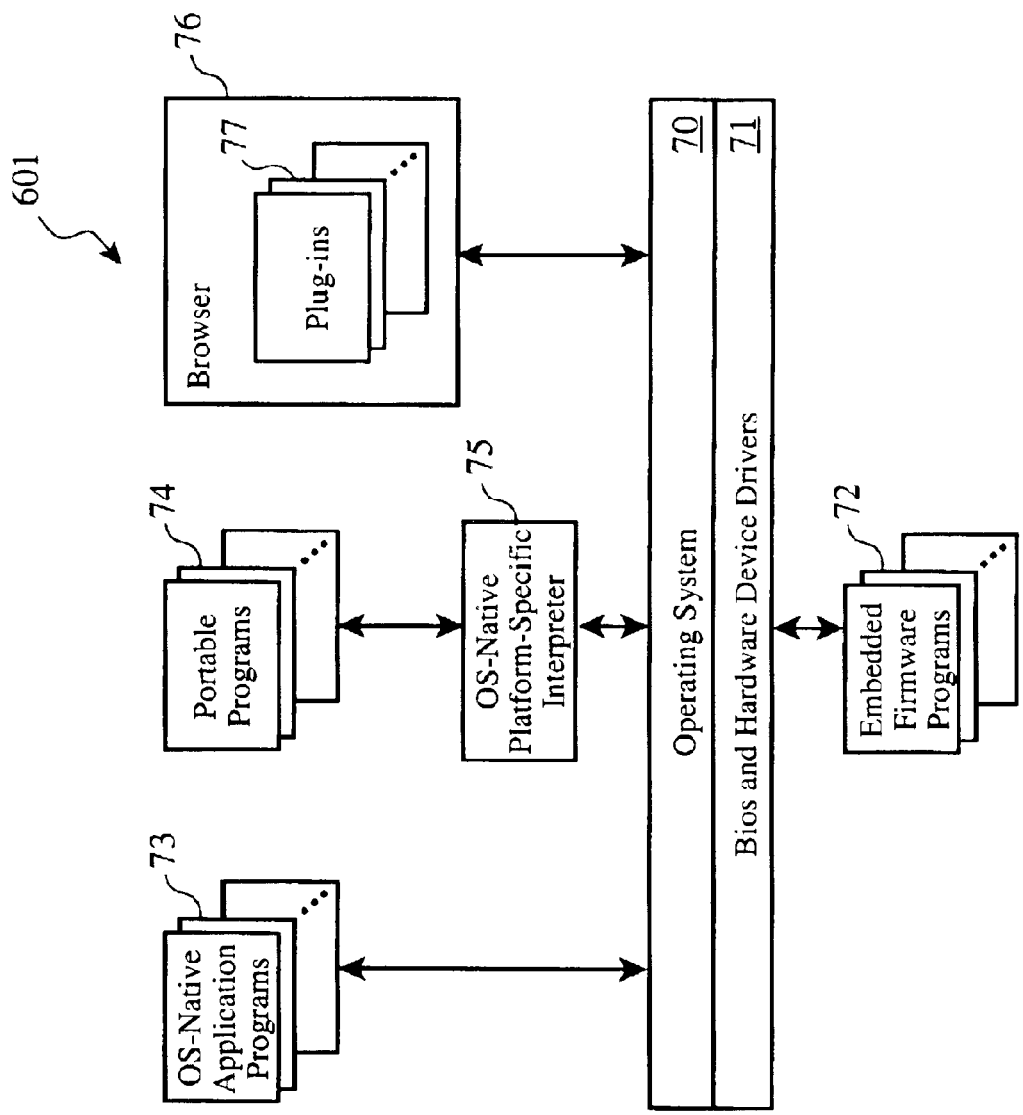
FIG. 5 provides more detail of a generalized organization of software and firmware on computing platforms as illustrated by FIG. 6.

Turning to now FIG. 5, more detail is given of a generalized organization of software and firmware (601) on this range of computing platforms. One or more operating system ("OS") native application programs (73) may be provided on the computing platform, such as word processors, spreadsheets, contact management utilities, address book, calendar, email client, presentation, financial and bookkeeping programs.

Additionally, one or more "portable" or device-independent programs (74) may be provided, which must be interpreted by an OS-native platform-specific interpreter (75), such as Java [TM] scripts and programs.

Often, computing platforms are also provided with a form of web browser or micro-browser (76), which may also include one or more extensions to the browser such as browser plug-ins (77).

The computing device is often provided with an operating system (70), such as Microsoft Windows [TM], UNIX, IBM OS/2 [TM], LINUX, MAC OS [TM] or other platform specific operating systems. Smaller devices such as PDA's and wireless telephones may be equipped with other forms of operating systems such as real-time operating systems ("RTOS") or Palm Computing's PalmOS [TM].

A set of basic input and output functions ("BIOS") and hardware device drivers (71) are often provided to allow the operating system (70) and programs to interface to and control the specific hardware functions provided with the computing platform.

Additionally, one or more embedded firmware programs (72) are commonly provided with many computing platforms, which are executed by onboard or "embedded" microprocessors as part of the peripheral device, such as a micro controller or a hard drive, a communication processor, network interface card, or sound or graphics card.

Figure 1:
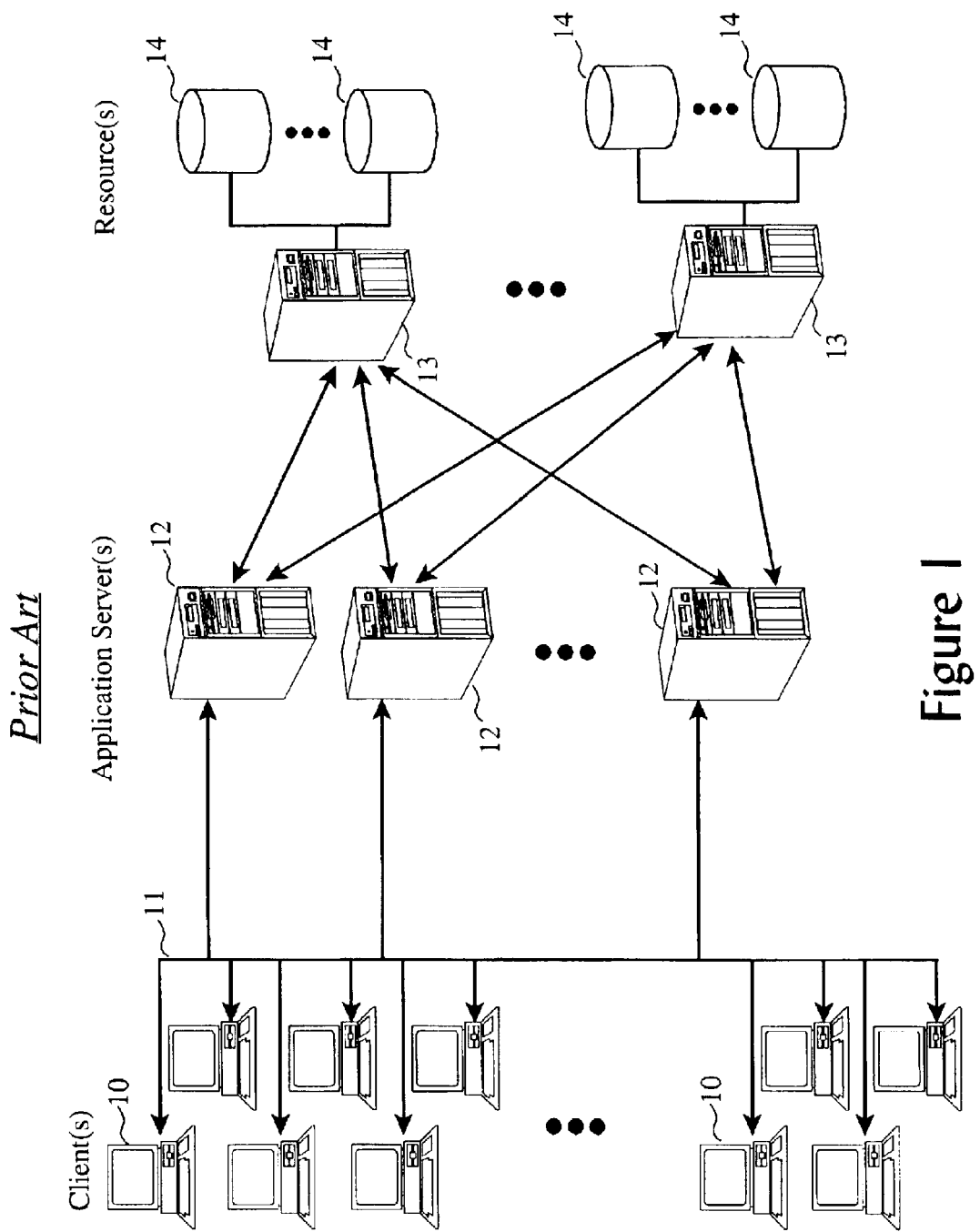
FIG. 1 illustrates the common, three-tiered model of client/server systems.
Figure 2:
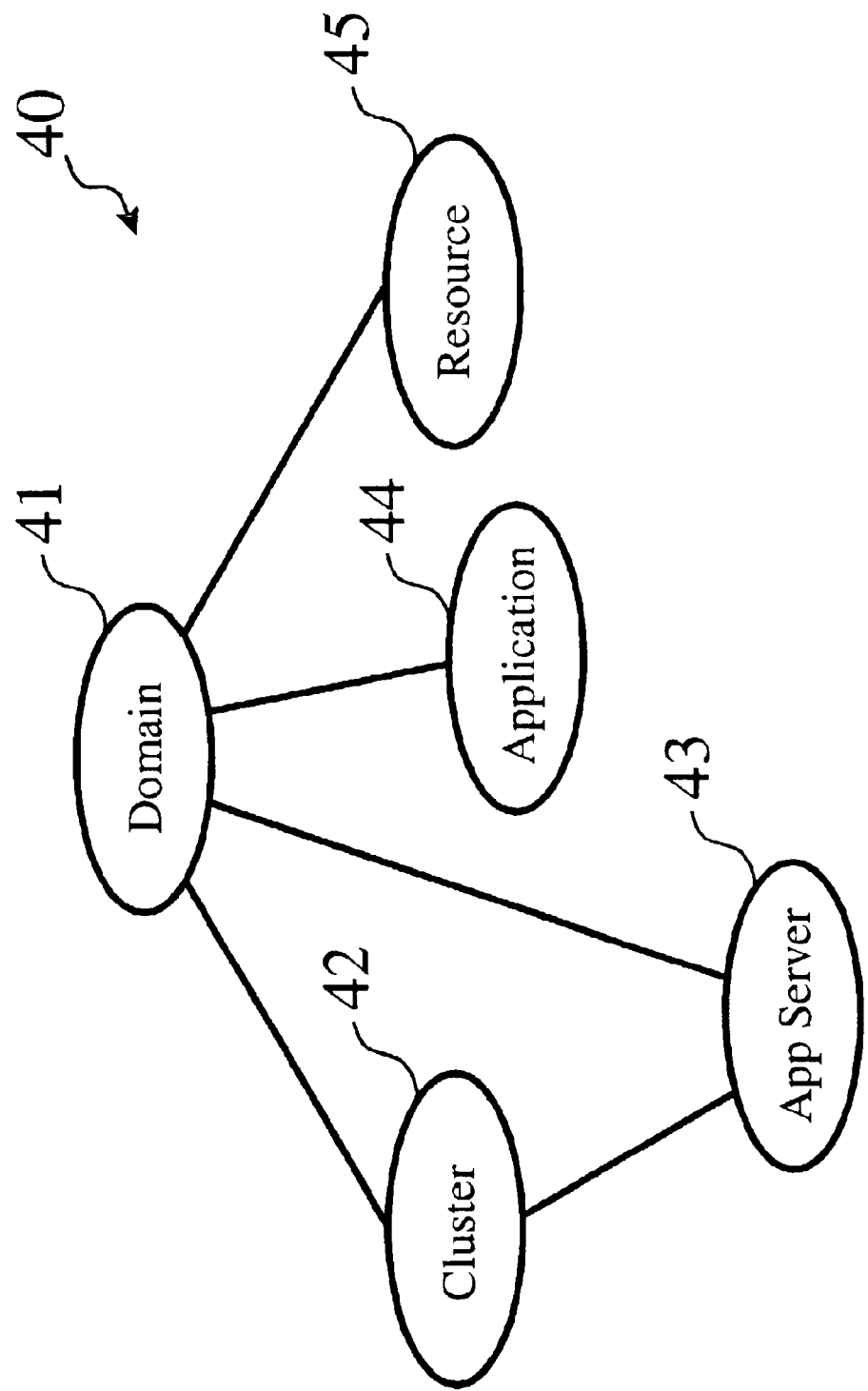
FIG. 2 depicts how system administrator access is allowed according a hierarchy organization of system resources.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV [TM] units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

We now turn our attention to description of the method of the invention and it's associated components. It is preferrably realized as a software extension to IBM's WebSphere application server software, the method may alternatively be implemented in conjunction with other suitable web server software or as a stand alone program. IBM's WebSphere product is well known in the art, and application developer kits as well as administrator training materials are readily available from IBM.

Our Method of Fine Grained Access Control According to User Role

In the process of developing the invention, we made the following observations:

(a) JMX management, JMS, and other system resources such as dynamic query, all have a tree-like hierarchy; and (b) JMX management, JMS, and other system resources all have categorized collections of operations into roles.

In the case of IBM's WebSphere JMX-based system management, there are four types of roles a user can be granted:

(1) monitor (can observe but cannot make changes);

(2) configurator (a monitor that can modify system configuration);

(3) operator (a monitor that can perform operations to change runtime state); and (4) administrator (a configurator and also an operator).

Figure 6:
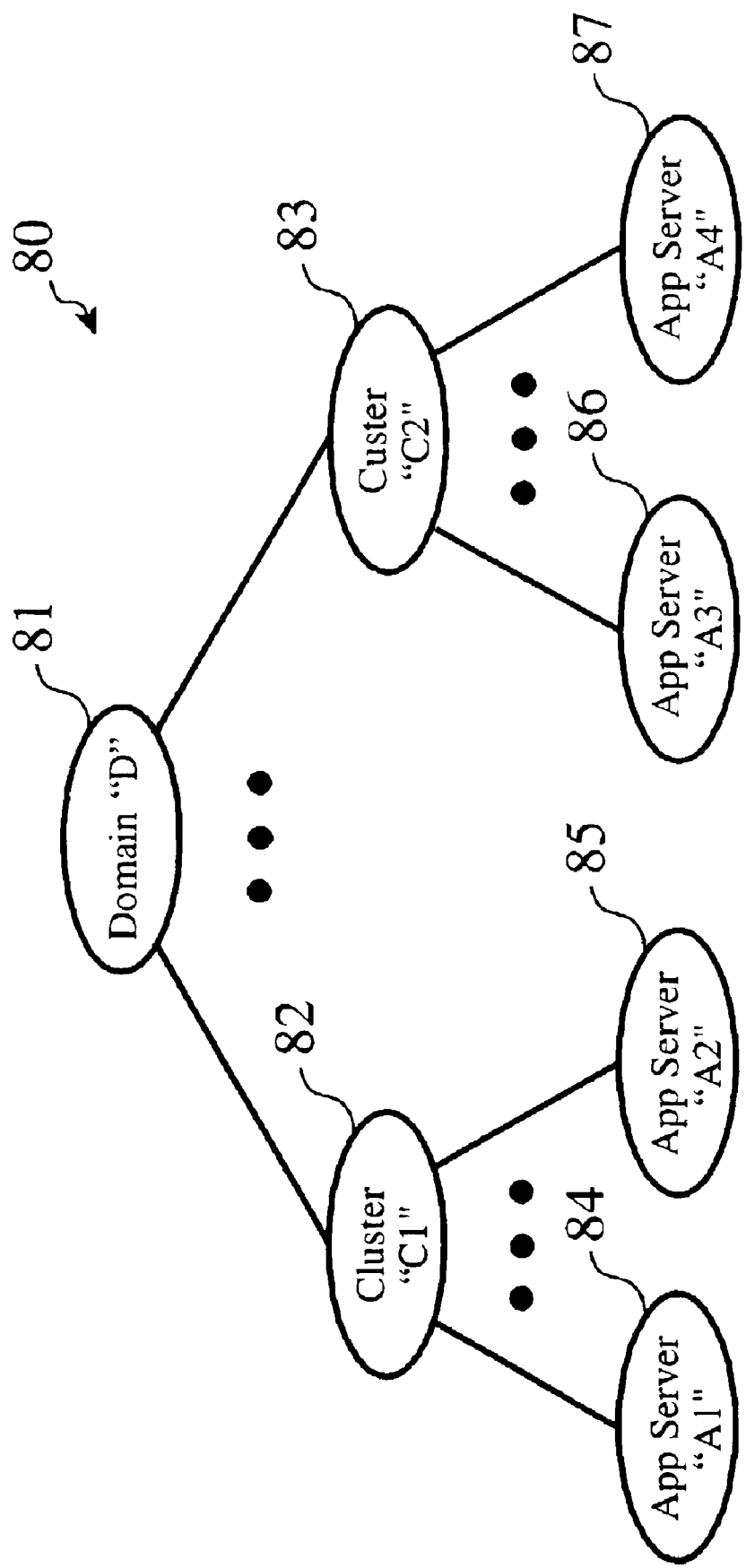
FIG. 6 shows a "type" and "instance" hierarchy for computing system resources.

Further, the system resources are organized according to the "type" hierarchy (40) as shown in FIG. 2, in which domains (41) are comprised of multiple clusters (42), applications (44), and resources (45), and in which application servers (44) may be part of a domain directly or indirectly (via a cluster). FIG. 6 shows an example instance tree (80) according to such a type hierarchy.

A system resource at the top, say a specific domain D (81), contains a sub tree of system resource instances in the subtree, for example clusters C1 (82) and C2 (83), as well as all application server instances in the subtree rooted at clusters C1 and C2, such as appServers A1 (84), A2 (85), A3 (86) and A4 (87), their applications and resources. In short, what is implied in the JMX system resources tree hierarchy is the "containing" relationship.

According to our preferred embodiment with the WebSphere system, we have chosen to model system management resources in a hierarchy with only three levels, as shown. This greatly reduces the complexity of the model. It will be recognized by those skilled in the art, however, that the system resources may be modeled with a hierarchy of many more levels. For example, a "node" may be added within the type hierarchy such that each domain contains zero or more nodes, nodes could be grouped into clusters, and application servers could be assigned to nodes.

In the case of the JMS Topics hierarchy, the Topics at the lower levels tend to get more and more specific than the Topic at a higher level in somewhat of a reverse fashion from the "type" and "instance" hierarchies.

The default WebSphere JMX management tree hierarchy has this containing relationship, and it is typical for a user who is granted the administrator role for the domain to be granted the same role for all system resources belonging to the specific domain.

In a first aspect of the invention, the system security policy is enhanced by separating it into two portions: (a) a Role Permission portion, and (b) a User-to-Role Map. In the Role Permission portions, "operations" to read runtime state, read system configuration, change runtime state and change system configuration are grouped into permission collections. The permission collections are assigned to corresponding security roles. This provides the advantage that this portion of the security policy (e.g. the definition of security roles and permission collections) can remain the same for different access control scope (e.g. at different levels of the tree and subtrees).

In the second portion of the enhanced security policy, the User-to-Role Map, or "Role Assignment", different users may be assigned to the same role for different access control scopes, at different levels of the tree or subtree. Based on the above observation, this invention makes the system resources at the lower level inherit the User Assignment policy of all its ancestors.

Application of Invention Method to Hierarchically Organized System Resources

We now present an example which illustrates the method of the invention and its advantages, and which uses the example resource tree of FIG. 6. The administrator role is used in this example, but the same principles apply to other security roles (configurator, operator, monitor), and to security roles in general.

In general, the Role Permission security policy is the same at every level in the tree, and administrator role is defined in every level of the tree. Now, suppose a first user U1 is assigned to the administrator role at Domain D, a second user U2 is assigned to the administrator role at Cluster C1, a third user U3 is assigned to the administrator role at AppServer A1, and a fourth user U4 is assigned to the administrator role at AppServer A3. According to our method, Cluster C1 and Cluster C2 will inherit the role assignment made at the domain level. Similarly, AppServer A1 and App Server A2 will inherit the role assignment made at Cluster C1. So, the role assignment table at the system resources will be as shown in Table 1.

TABLE 1

Example Generic Role Assignment Table

| Resource Tree Level | Role Assignment |
| --- | --- |
| Domain D | user U1 |
| Cluster C1 | user U1, U2 |
| App Server A1 | user U1, U2, U3 |
| App Server A2 | user U1, U2 |
| Cluster C2 | user U1 |
| App Server A3 | user U1, U4 |
| App Server A4 | user U1 |

This role assignment inheritance property of the method greatly improves the manageability of WebSphere management system resources. For example, to add a new administrator for the entire domain, one must only add that user to one role assignment table at the domain level D. Similarly, to remove the second user U2 as the administrator for Cluster C2, only the role assignment table at Cluster C2 needs to be modified. Without role assignment inheritance, each and every role assignment table would have to be modified when adding or deleting a user from the administrator role at the domain level.

Table 3 provides an example Role Assignment Table according to the preferred embodiment, in which several users (user4, user5, user6, etc.) are assigned to various security roles in extensible markup language ("XML"). The Role Assignment Table could be defined in many other formats, as well, including but not limited to simple text files, database records, etc., as will be recognized by those skilled in the art.

TABLE 3

Example Role Assignment Table in XML

```
<?xml version="1.0" encoding="UTF-8"?>
<xmi:XMI xmi:version="2.0" xmlns:xmi="http://www.omg.org/XMI"
xmlns:rolebasedauthz="rolebasedauthz.xmi">
    <xmi:Documentation>
    <contact>{Your Contact Info}</contact>
    </xmi:Documentation>
    <rolebasedauthz:AuthorizationTableExt
    xmi:id="AuthorizationTableExt_1" context="domain">
    <authorizations xmi:id="RoleAssignmentExt_1"
    role="SecurityRoleExt_1">
        <users xmi:id="UserExt_1" name="user4" accessId="user4"/>
        <users xmi:id="UserExt_2" name="user5" accessId="user5"/>
        <users xmi:id="UserExt_3" name="user6" accessId="user6"/>
        <users xmi:id="UserExt_4" name="user7" accessId="user7"/>
        <users xmi:id="UserExt_5" name="user8" accessId="user8"/>
        <users xmi:id="UserExt_6" name="user9" accessId="user9"/>
        <users xmi:id="UserExt_7" name="user10" accessId=
           "user10"/>
    </authorizations>
    <authorizations xmi:id="RoleAssignmentExt_2"
    role="SecurityRoleExt_2">
        <users xmi:id="UserExt_8" name="user1" accessId="user1"/>
        <users xmi:id="UserExt_9" name="user2" accessId="user2"/>
        <users xmi:id="UserExt_10" name="user3" accessId="user3"/>
        <users xmi:id="UserExt_11" name="user4" accessId="user4"/>
        <users xmi:id="UserExt_12" name="user5" accessId="user5"/>
        <users xmi:id="UserExt_13" name="user6" accessId="user6"/>
        <groups xmi:id="GroupExt_1" name="group1" accessId=
           "group1"/>
        <groups xmi:id="GroupExt_2" name="group2" accessId=
           "group2"/>
        <groups xmi:id="GroupExt_3" name="group3" accessId=
           "group3"/>
        <specialSubjects
    xmi:type="rolebasedauthz:AllAuthenticatedUsersExt"
    xmi:id="AllAuthenticatedUsersExt_1"/>
    </authorizations>
    <authorizations xmi:id="RoleAssignmentExt_3"
    role="SecurityRoleExt_3">
        <users xmi:id="UserExt_14" name="user4" accessId="user4"/>
        <users xmi:id="UserExt_15" name="user5" accessId="user5"/>
        <users xmi:id="UserExt_16" name="user6" accessId="user6"/>
        <groups xmi:id="GroupExt_4" names="group1" accessId=
           "group1"/>
    </authorizations>
    <authorizations xmi:id="RoleAssignmentExt_4"
    role="SecurityRoleExt_4">
        <specialSubjects xmi:type="rolebasedauthz:EveryoneExt"
    xmi:id="EveryoneExt_1"/>
    </authorizations>
    <roles xmi:id="SecurityRoleExt_1" roleName="administrator"/>
    <roles xmi:id="SecurityRoleExt_2" roleName="operator"/>
    <roles xmi:id="SecurityRoleExt_3" roleName="configurator"/>
    <roles xmi:id="SecurityRoleExt_4" roleName="monitor"/>
    </rolebasedauthz:AuthorizationTableExt>
</xmi:XMI>
```

There is also a security role inheritance relationship implemented in WebSphere, as shown in FIG. 7, in which the operator role (92) inherits the monitor role (91) and the configurator role (93) inherits the monitor role (91). The administrator role (94) inherits operator role (92) and configurator role (93). The administrator role (94) also inherits the monitor role (91) via the inheritance of the monitor role (91) of the operator role (92) or the configurator role (93).

By providing role inheritance relationship, the role permission table schema is greatly simplified. The role permission table declarative language, preferrably made in XML allows the following syntax, expressed in "plain words" in Table 4.

TABLE 4

'Plain Wording' Role Permission Table security role monitor
security role operator imply monitor
security role configuration imply monitor
security role administrator imply operator, configurator With role inheritance such as this, all system methods only need to be assigned to the least privileged security role. In this case, all read-only operations are assigned to the monitor role, all operations that modify configuration are assigned to the configurator role, and all operations that change runtime state are assigned to the operator role.

Further, by providing role inheritance, both configurator and operator role automatically get permission to read-only operations, and the administrator role automatically gets access to all the above mentioned operations.

Table 5 provides an example of such a Role Permissions Table, which is defined in XML according to the preferred embodiment. As will be readily apparent to those skilled in the art, alternate definitions of the Role Permissions Table could equally well be adopted (e.g. plain text, database records, etc.), as desired.

TABLE 5

Example Role Permission Table in XML

```
<?xml version=1.0" encodings="UTF-8"?>
<!DOCTYPE role-permission SYSTEM
  "RolePermissionDescriptor.dtd" >
<role-permission>
    <resource>
        <resource-name>sample</resource-name>
        <class-name>com.ibm.ws.security.descriptor.sample</
        class-name>
        <description>This is a sample role permission descriptor.
</description>
    </resource>
    <security-role>
        <role>
            <role-name>monitor</role-name>
        </role>
    </security-role>
    <security-role>
        <role>
            <role-name>operator</role-name>
            <imply>
                <role-name>monitor</role-name>
            </imply>
        </role>
    </security-role>
    <security-role>
        <role>
            <role-name>configurator</role-name>
            <imply>
                <role-name>monitor</role-name>
            </imply>
        </role>
    </security-role>
    <security-role>
        <role>
            <role-name>administrator</role-name>
            <imply>
                <role-name>operator</role-name>
                <role-name>configurator</role-name>
            </imply>
        </role>
    </security-role>
    <method-permission>
        <description>Sample method permission table</description>
        <role-name>operator</role-name>
        <method>
```

TABLE 5-continued

Example Role Permission Table in XML

```
            <description>Sample operation</description>
            <resource-name>sample</resource-name>
            <method-name>stop</method-name>
        </method>
    </method-permission>
    <method-permission>
        <description>Sample method permission table</description>
        <role-name>operator</role-name>
        <method>
            <description>Sample operation</description>
            <resource-name>sample</resource-name>
            <method-name>start</method-name>
            <method-params>
                <method-param>java.lang.String</method-param>
                <method-param>java.lang.String</method-param>
            </method-params>
        </method>
    </method-permission>
    <method-permission>
        <description>Sample method permission table</description>
        <role-name>operator</role-name>
        <method>
            <description>Sample operation</description>
            <resource-name>sample</resource-name>
            <method-name>monitor</method-name>
            <method-params>
            </method-params>
        </method>
    </method-permission>
    <method-permission>
        <description>Sample method permission table</description>
        <role-name>configurator</role-name>
        <method>
            <description>Sample operation</description>
            <resource-name>sample</resource-name>
            <method-name>setValue</method-name>
            <method-params>
                <method-param>java.lang.Boolean</method-param>
            </method-params>
        </method>
    </method-permission>
    <method-permission>
        <description>sample method permission table</description>
        <role-name>monitor</role-name>
        <method>
            <description>Sample operation</description>
            <resource-name>sample</resource-name>
            <method-name>getValue</method-name>
        </method>
    </method-permission>
</role-permission>
```

The example provided in Table 5 shows a fairly generic naming convention for the various roles for illustrative purposes. Any number of security roles, names, and inheritance relationships may be defined according to the invention as needed in a specific enterprise. The WebSphere system, for example, utilizes a set of security roles including CosNamingRead, CosNamingWrite, CosNamingCreate, and CosNaming Delete, with the following inheritance relationships:

(a) CosNamingWrite inherits CosNamingRead;
(b) CosNamingCreate inherits CosNamingWrite; and
(c) CosNamingDelete inherits CosNamingCreate.

As such, for example, an administrator assigned to the CosNamingDelete role would also be able to create, but an administrator only assigned the CosNamingCreate role would not be able to delete (e.g. "create only" role). This scheme also provides a "read only" role (e.g. CosNamingRead), similarly.

Application of Invention Method to Topic Hierarchies

According to the method of the invention, the JMS Topic tree hierarchy is has the characteristic that topics toward the tree "leaf" becoming more specific than the topics toward the "root" of the tree. In other words, topics towards the tree leaf tend to contain more sensitive information (and a broader range of information), and may make sense for it to require more privilege to access than topics closer to the root.

Again, like application to the system resources hierarchy, the Role Permission portion of the security policy remains the same for topics at all levels. Basically, a user must have a "publisher role" for a specific topic to publish articles into it, and must have a "subscriber" role to that topic to read articles from it, for example.

In general, however, the role assignment table will be different at different topics. So, a "reverse inheritance" role assignment scheme is applied to address the JMS role assignment problem. In the reverse inheritance role assignment scheme, a user assigned to a security role for a specific topic is given the same roles for all topics that are "ancestors" of the specific topics for which a role is assigned.

Using the above sports example, a user who is given the "subscriber" role for the "yachting" topic can read articles from the yachting topic, as well as read articles from the "water" topic and the more general "sports" topic. But, that user cannot read articles in "windsurfing", because that topic is not an ancestor of the "yachting" topic in the topic tree hierarchy (e.g. it is a sibling).

The reverse inheritance role assignment methods simplifies the role assignment problem because it only needs to make role assignment at exactly one place.

Figure 8A:
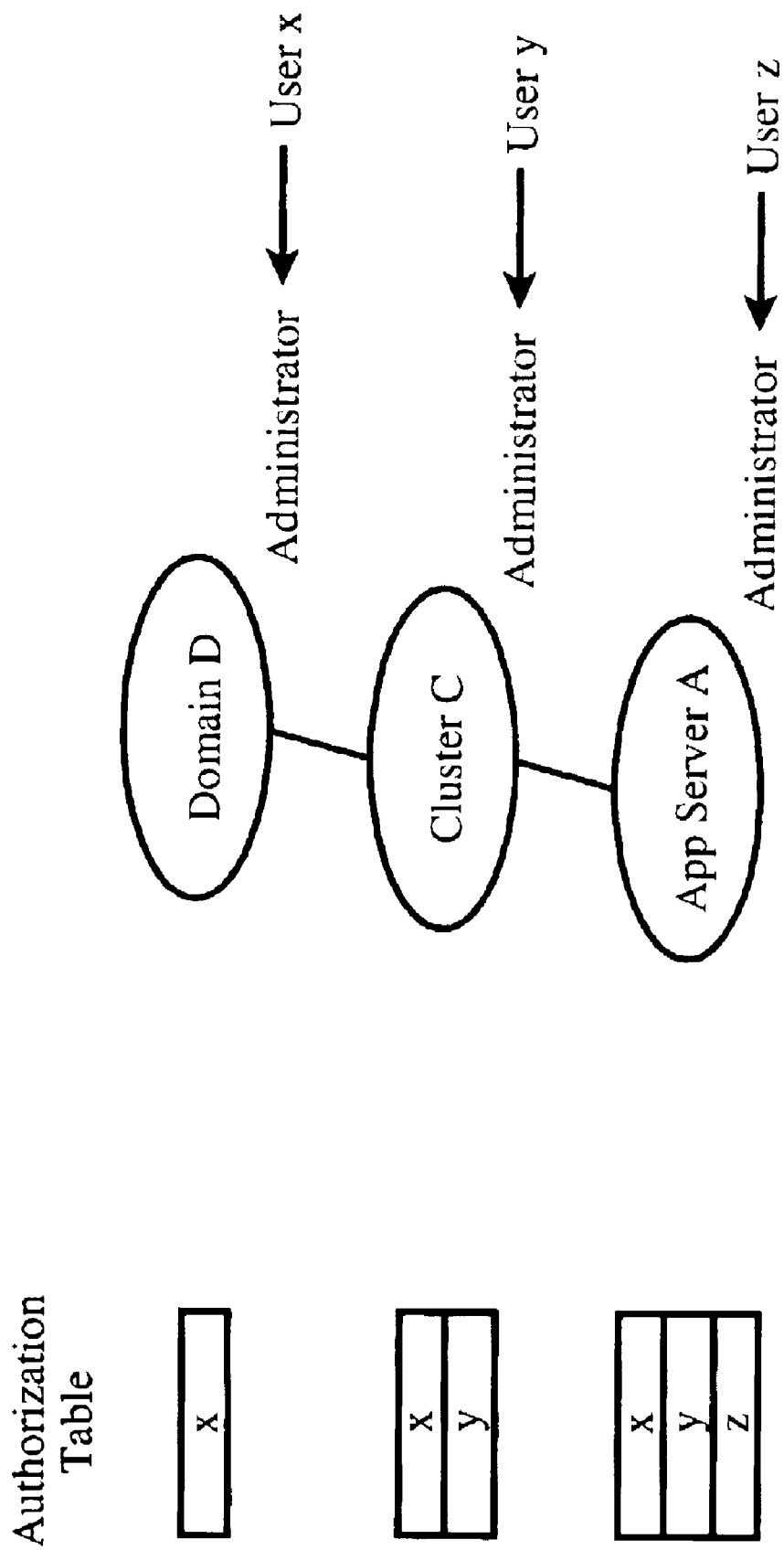
FIGS. 8a and 8b illustrate "normal" and "downward" inheritance, respectively.
Figure 8B:
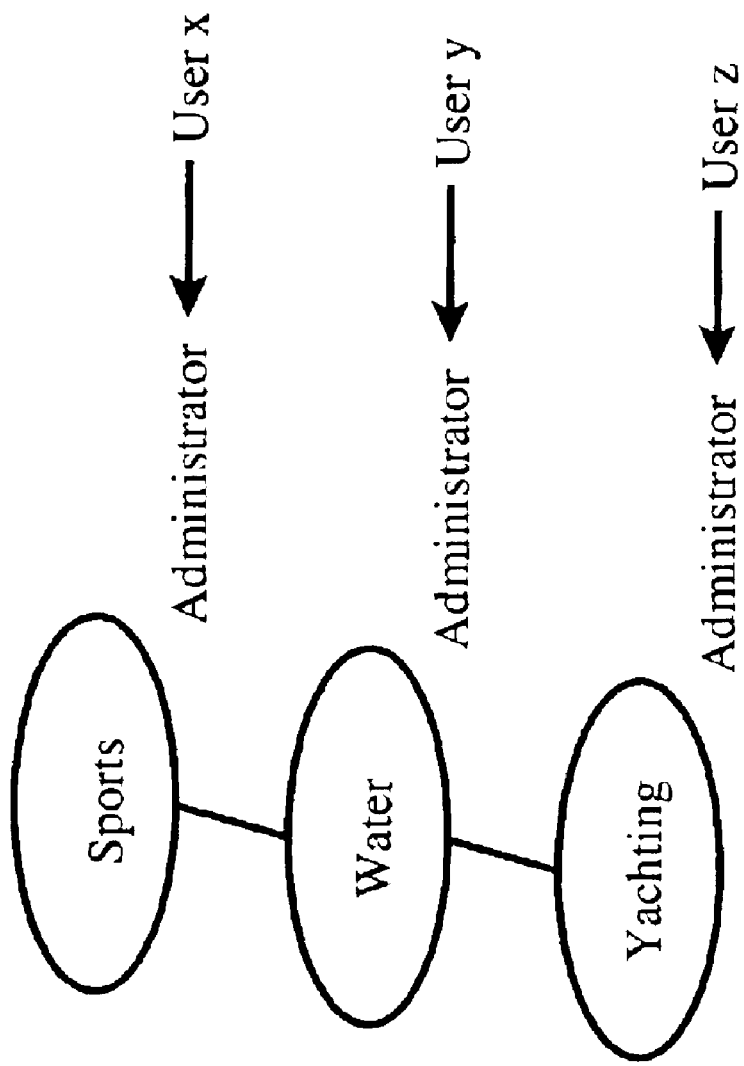

FIGS. 8a and 8b illustrate these principles of normal inheritance and reverse inheritance. In FIG. 8a, "normal" or "downward" inheritance is illustrated wherein an administrator at an upper level in the tree receives by inheritance administrator abilities for all levels below that point in the tree (e.g. for all child levels).

In FIG. 8b, "reverse" or "upward" inheritance is illustrated, such as that employed for the JMS Topic hierarchy, wherein a subscriber at a certain level receives subscriber abilities at all "higher" levels in the tree (e.g. for all ancestor or parent levels).

To address those different requirements from various application environments, the invention provides several configurable behaviors: normal (downward) inheritance, reverse (upward) inheritance, or no inheritance.

General Logical Process of the Invention

Figure 9:
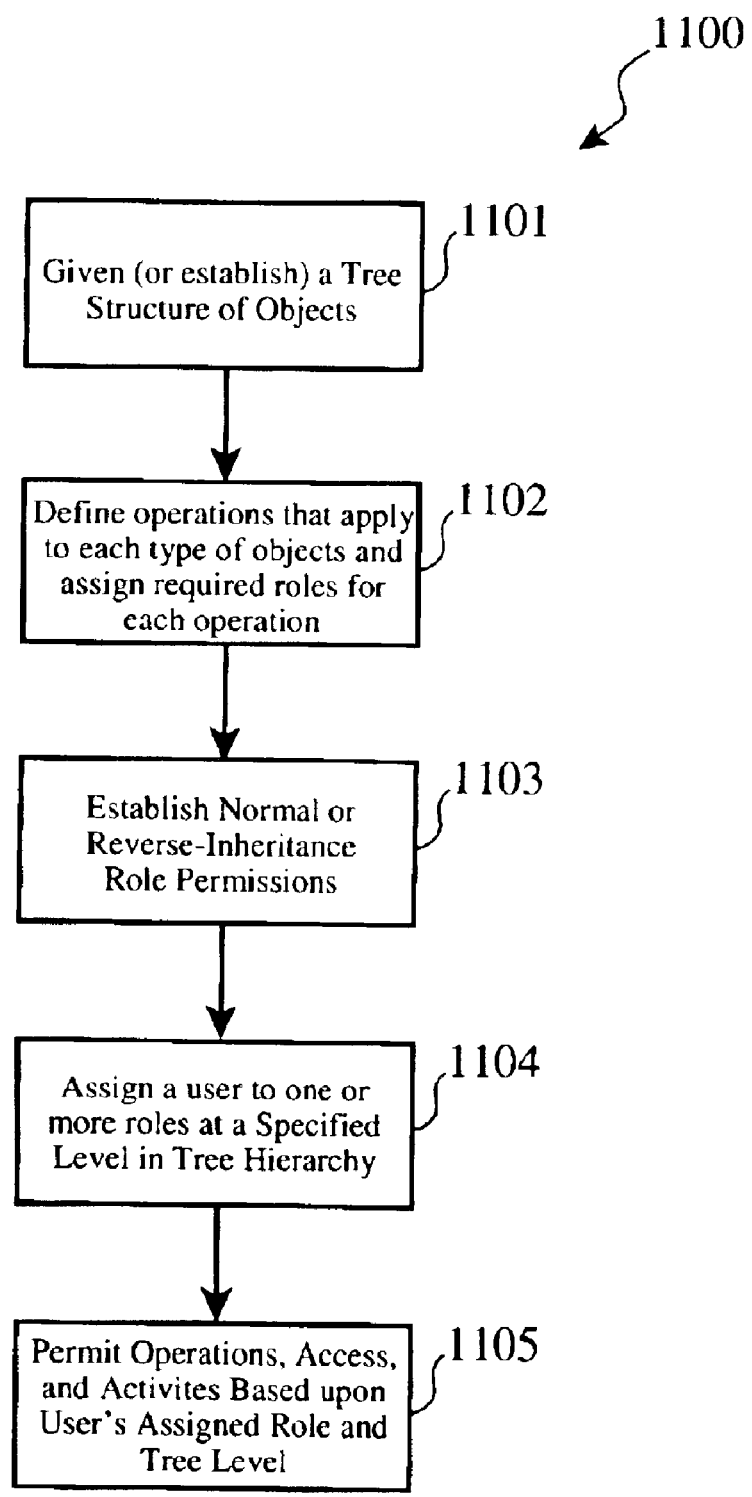
FIG. 9 sets forth the logical process of the invention.

Turning now to FIG. 9, the logical process of the invention is shown in a generalized manner, in which a given system objects hierarchical tree structure (1101) is previously known or is established by this process, such as a messaging service topic hierarchy or a networked computing system resource hierarchy.

Next, the operations which apply to each type of objects are defined, and roles are assigned to each operation (1102).

For this tree structure, a normal or reverse inheritance Role Permissions table is established (1103). Then, a Role-to-User map is established (1104), following which each user is allowed (1105) to have the abilities and permissions of their particular assigned role, as well as the inherited (normal or reverse) permissions of ancestor or child roles, depending on the type of inheritance established (1103).

Summary

While the invention has been disclosed in terms of a preferred embodiment and certain illustrative examples have been provided, it will be recognized by those skilled in the art that certain variations may be made without departing from the spirit and scope of the invention. Such variations and alternate implementations may include, but are not limited to, adoption of alternate programming methodologies, programming languages, computing platforms, and security administration suites. Therefore, the scope of the present invention should be determined by the following claims.

What is claimed is:

1. A method of providing role-based access in a networked computer system, said computer system comprising a plurality of objects on which users wish to perform operations, said method comprising the steps of:

organizing said computer system objects into a hierarchical tree structure having a plurality of parent-child object relationships, each of said computer system objects representing a computer system resource to which access is to be controlled, said hierarchical tree having a topmost parent object, and each child object having one or more ancestor objects towards and including said topmost parent object;

providing a Role Permission portion of a security policy in which operations on said computer system objects are grouped into permission collections and are assigned to corresponding security roles, said Role Permission portion defining a unidirectional inheritance definition such that when a particular role is applied to a certain level in said hierarchical tree structure, the scope of permitted access for that role is determined according to said inheritance definition and said parent-child object relationships;

providing a Role Assignment portion of a security policy in which a plurality of users are assigned a security role and a hierarchy level, said Role Assignment portion and said Role Permission portion being independent of each other; and responsive to an operation request from a requesting user, evaluating said Role Permission and Role Assignment portions of the security policy, and granting permission for said operation request only if said operation is permitted at said request user's assigned role and system hierarchy level or if said operation is permitted via said inheritance definition at another system hierarchy level.

2. The method as set forth in claim 1 wherein:

said step of organizing said computer system objects into a hierarchical tree structure comprises providing a tree structure of system resources selected from the group of domain, cluster, application, application server and application resource, with said domain being the topmost system object; and said step of providing a unidirectional inheritance definition within said Role Permission portion comprises providing a downward inheritance definition from said domain to said clusters, applications, application servers, and application resources such that a requesting user may inherit permissions from hierarchy levels below that user's assigned hierarchy level including all child and child descendant objects.

3. The method as set forth in claim 2 wherein the step of providing a Role Permission portion of a security policy in which operations on said computer system objects are grouped into permission collections and are assigned to corresponding security roles comprises grouping one or more operations selected from the group of reading system runtime state, reading system configuration, changing system runtime state and changing system configuration into one or more permission collections.

4. The method as set forth in claim 2 wherein the step of providing a Role Permission portion of a security policy in which operations on said computer system objects are grouped into permission collections and are assigned to corresponding security roles comprises assigning each permission collection to at least one corresponding security role selected from the group of monitor, operator, configurator, and administrator.

5. The method as set forth in claim 4 wherein said step of assigning each permission collection to at least one corresponding security role comprises the steps of:

assigning permission as an operator implies assigning permission as a monitor;

assigning permission as a configurator implies assigning permission as a monitor; and assigning permission as an administrator implies assigning permission as an operator, a configurator and indirectly as a monitor.

6. The method as set forth in claim 1 wherein:

said step of organizing said computer system objects into a hierarchical tree structure comprises providing a tree structure of information topics with a topmost general topic, and with a plurality of more specific subtopics having one or more ancestor topics including said general topic; and said step of providing a unidirectional inheritance definition within said Role Permission portion comprises providing an upward (reverse) inheritance definition from said subtopics to said ancestor topics, such that a requesting user may inherit permissions from ancestor hierarchy levels above that user's assigned hierarchy level.

7. The method as set forth in claim 6 wherein the step of providing a Role Permission portion of a security policy in which operations on said computer system objects are grouped into permission collections and are assigned to corresponding security roles comprises grouping one or more operations selected from the group of publish-only, read-only, and publish-and-read.

8. The method as set forth in claim 6 wherein the step of providing a Role Permission portion of a security policy in which operations on said computer system objects are grouped into permission collections and are assigned to corresponding security roles comprises assigning each permission collection to at least one corresponding security role selected from the group of publisher, reader, or publish-and-read subscriber.

9. The method as set forth in claim 8 wherein said step of assigning each permission collection to at least one corresponding security role wherein the step of assigning permission as a publish-and-read subscriber implies assigning permission as a reader and as a publisher.

10. A computer readable medium encoded with software for providing role-based access in a networked computer system, said computer system comprising a plurality of objects on which users wish to perform operations, said software causing a security server to perform the steps of:

organizing said computer system objects into a hierarchical tree structure having a plurality of parent-child object relationships, each of said computer system objects representing a computer system resource to which access is to be controlled, said hierarchical tree having a topmost parent object, and each child object having one or more ancestor objects towards and including said topmost parent object;

providing a Role Permission portion of a security policy in which operations on said computer system objects are grouped into permission collections and are assigned to corresponding security roles, said Role Permission portion defining a unidirectional inheritance definition such that when a particular role is applied to a certain level in said hierarchical tree structure, the scope of permitted access for that role is determined according to said inheritance definition and said parent-child object relationships;

providing a Role Assignment portion of a security policy in which a plurality of users are assigned a security role and a hierarchy level, said Role Assignment portion and said Role Permission portion being independent of each other; and responsive to an operation request from a requesting user, evaluating said Role Permission and Role Assignment portions of the security policy, and granting permission for said operation request only if said operation is permitted at said request user's assigned role and system hierarchy level or if said operation is permitted via said inheritance definition at another system hierarchy level.

11. The computer readable medium as set forth in claim 10 wherein:

said software for organizing said computer system objects into a hierarchical tree structure comprises software for organizing a tree structure of system resources selected from the group of domain, cluster, application, application server and application resource, with said domain being the topmost system object; and said software for providing a unidirectional inheritance definition within said Role Permission portion comprises software for providing a downward inheritance definition from said domain to said clusters, applications, application servers, and application resources such that a requesting user may inherit permissions from hierarchy levels below that user's assigned hierarchy level including all child and child descendant objects.

12. The computer readable medium as set forth in claim 11 wherein the software for providing a Role Permission portion of a security policy in which operations on said computer system objects are grouped into permission collections and are assigned to corresponding security roles comprises software for grouping one or more operations selected from the group of reading system runtime state, reading system configuration, changing system runtime state and changing system configuration into one or more permission collections.

13. The computer readable medium as set forth in claim 11 wherein the software for providing a Role Permission portion of a security policy in which operations on said computer system objects are grouped into permission collections and are assigned to corresponding security roles comprises software for assigning each permission collection to at least one corresponding security role selected from the group of monitor, operator, configurator, and administrator.

14. The computer readable medium as set forth in claim 13 wherein said software for assigning each permission collection to at least one corresponding security role comprises software for performing the steps of:

assigning permission as an operator implies assigning permission as a monitor;

assigning permission as a configurator implies assigning permission as a monitor; and assigning permission as an administrator implies assigning permission as an operator, a configurator and indirectly as a monitor.

15. The computer readable medium as set forth in claim 10 wherein:

said software for organizing said computer system objects into a hierarchical tree structure comprises software for providing a tree structure of information topics with a topmost general topic, and with a plurality of more specific subtopics having one or more ancestor topics including said general topic; and wherein said software for providing a unidirectional inheritance definition within said Role Permission portion comprises software for providing an upward (reverse) inheritance definition from said subtopics to said ancestor topics, such that a requesting user may inherit permissions from ancestor hierarchy levels above that user's assigned hierarchy level.

16. The computer readable medium as set forth in claim 15 wherein the software for providing a Role Permission portion of a security policy in which operations on said computer system objects are grouped into permission collections and are assigned to corresponding security roles comprises software for grouping one or more operations selected from the group of publish-only, read-only, and publish-and-read.

17. The computer readable medium as set forth in claim 15 wherein the software for providing a Role Permission portion of a security policy in which operations on said computer system objects are grouped into permission collections and are assigned to corresponding security roles comprises software for assigning each permission collection to at least one corresponding security role selected from the group of publisher, reader, or publish-and-read subscriber.

18. The computer readable medium as set forth in claim 17 wherein said software for assigning each permission collection to at least one corresponding security role comprises software in which assigning permission as a publish-and-read subscriber implies assigning permission as a reader and as a publisher.

19. A system for providing line grained access control to a plurality of system objects within a networked computer system on which users wish to perform operations, said system comprising:

a hierarchical tree structure representing said system objects, each of said computer system objects representing a computer system resource to which access is to be controlled, said tree structure having a plurality of parent-child object relationships, said hierarchical tree having a topmost parent object, and each child object having one or more ancestor objects towards and including said topmost parent object;

a Role Permission portion of a security policy in which operations on said computer system objects are grouped into permission collections and are assigned to corresponding security roles, said Role Permission portion defining a unidirectional inheritance definition such that when a particular role is applied to a certain level in said hierarchical tree structure, the scope of permitted access for that role is determined according to said inheritance definition and said parent-child object relationships;

a Role Assignment portion of a security policy in which a plurality of users are assigned a security role and a hierarchy level, said Role Assignment portion and said Role Permission portion being independent of each other;

a means for receiving an operation request from a requesting user, and for transmitting an operation grant to said requesting user; and a security server means for evaluating said Role Permission and Role Assignment portions of the security policy upon receipt of an operation request, and for granting permission for said operation request only if said operation is permitted at said request user's assigned role and system hierarchy level or if said operation is permitted via said inheritance definition at another system hierarchy level.

20. The system as set forth in claim 19 wherein:

said hierarchical tree structure comprises a system resources selected from the group of domain, cluster, application, application server and application resource, with said domain being the topmast system object; and said unidirectional inheritance definition within said Role Permission portion comprises a downward inheritance definition from said domain to said clusters, applications, application servers, and application resources such that a requesting user may inherit permissions from hierarchy levels below that user's assigned hierarchy level including all child and child descendant objects.

21. The system as set forth in claim 20 wherein said Role Permission portion of a security policy comprises groups of one or more operations selected from the group of reading system runtime state, reading system configuration, changing system runtime state and changing system configuration into one or more permission collections.

22. The system as set forth in claim 20 wherein said Role Permission portion of a security policy comprises assignments of each permission collection to at least one corresponding security role selected from the group of monitor, operator, configurator, and administrator.

23. The system as set forth in claim 22 wherein said assignment of each permission collection to at least one corresponding security role comprises:

operator assignments which imply monitor permissions;

configurator assignments which imply monitor permissions; and administrator assignments which imply operator and configurator permissions, and indirectly implies monitor permissions.

24. The system as set forth in claim 19 wherein:

said hierarchical tree structure comprises information topics with a topmost general topic, and with a plurality of more specific subtopics having one or more ancestor topics including said general topic; and said unidirectional inheritance definition within said Role Permission portion comprises an upward (reverse) inheritance definition from said subtopics to said ancestor topics, such that a requesting user may inherit permissions from ancestor hierarchy levels above that user's assigned hierarchy level.

25. The system as set forth in claim 24 wherein said Role Permission portion of a security policy comprises groups of one or more operations selected from the group of publish-only, read-only, and publish-and-read.

26. The system as set forth in claim 25 wherein said Role Permission portion comprises assignments of each permission collection to at least one corresponding security role selected from the group of publisher, reader, or publish-and-read subscriber.

27. The system as set forth in claim 26 wherein said assignment of each permission collection to a publish-and-read subscriber roles implies assignment as a reader role and as a publisher role.

* * * * *